(12) United States Patent
Huang

(10) Patent No.: US 7,313,841 B2
(45) Date of Patent: Jan. 1, 2008

(54) SUSPENDABLE MAGNETIC BRUSH FOR CLEANING AN AQUARIUM WITH A CURVED WINDOW SURFACE

(76) Inventor: Tong Huang, 405, 10#, Wan Shou Bei Street, Haizhu District, Guangzhou City, Guangdon Province (CN) 510230

(*) Notice: Subject to any disclaimer, the term of this patent is extended or adjusted under 35 U.S.C. 154(b) by 114 days.

(21) Appl. No.: 10/528,257

(22) PCT Filed: Sep. 29, 2002

(86) PCT No.: PCT/CN02/00704

§ 371 (c)(1),
(2), (4) Date: Mar. 17, 2005

(87) PCT Pub. No.: WO2004/026078

PCT Pub. Date: Apr. 1, 2004

(65) Prior Publication Data

US 2006/0048326 A1    Mar. 9, 2006

(30) Foreign Application Priority Data

Sep. 18, 2002 (CN) ............................... 02 2 48137

(51) Int. Cl.
*A01K 63/04* (2006.01)
*A47L 1/12* (2006.01)
(52) U.S. Cl. ..................... 15/220.2; 119/264
(58) Field of Classification Search ............... 15/220.2, 15/1.7; 119/264, 245; 114/222; 441/30, 441/60
See application file for complete search history.

(56) References Cited

U.S. PATENT DOCUMENTS 4,929,205 A * 5/1990 Jones ........................... 441/60
5,331,760 A * 7/1994 DuMont ....................... 43/17.1
5,515,570 A * 5/1996 Muscroft ..................... 15/220.2
6,206,978 B1 * 3/2001 Tsui ................................ 134/8
6,348,104 B1 * 2/2002 Bakker ............................ 134/6
6,634,052 B2 * 10/2003 Hanson ..................... 15/220.2

FOREIGN PATENT DOCUMENTS

| CN | 2219047 Y | 2/1996 |
| CN | 1302182 | 7/2001 |
| GB | 2105977 | 4/1983 |

* cited by examiner

*Primary Examiner*—Laura C Guidotti
(74) *Attorney, Agent, or Firm*—Advantia Law Group; Michael W. Starkweather; Weili Cheng

(57) ABSTRACT

Present invention relates a suspendable magnetic brush for cleaning an aquarium with curved window surface, characterized in that an upper cover with an air chamber is attached tightly to a bottom cover with a cleaning material layer underneath, and an inner cover with a magnet located therein is provided inside the air chamber, said inner cover being attached to the bottom cover while isolated from the air chamber. Said upper cover having through holes connecting the air chamber to the exterior of the device. It is possible to adjust the air or liquid in the air chamber through the holes connecting the upper cover and the air chamber so that the weight of the interior magnetic brush can be adjusted so as to balance all the forces exerted upon the interior magnetic brush. As a result the interior elements of the brush can suspend in the water and move smoothly on the aquarium window upon the manipulation of the exterior brush. With the convex edge(s) of the bottom cover matching the curved window surface of the aquarium the magnetic brush can clean both curved window surface and the planar window surface as well.

9 Claims, 5 Drawing Sheets

SUSPENDABLE MAGNETIC BRUSH FOR CLEANING AN AQUARIUM WITH A CURVED WINDOW SURFACE

CROSS-REFERENCE TO RELATED APPLICATIONS AND CLAIM OF PRIORITY

This application claims benefit of Patent Application No. PCT/CN2002/000704, filed on Sep. 29, 2002, which claims priority to Chinese Patent Application No. CN02248137.0, filed on Sep. 18, 2002.

TECHNICAL FIELD

The present invention relates to an apparatus for cleaning aquarium windows, in particular a magnetic brush for cleaning an aquarium having curved window surface which makes use of magnetic force to produce attraction.

BACKGROUND OF THE INVENTION

Chinese Patent Application No. 00800767.5 discloses a device that uses magnets to move the brush on planar aquarium windows, thus cleaning the window surface. The interior element of such a brush has an air chamber therein. After magnetic contact is broken, the interior element will float on the surface of the water so that it can be readily removed. As such, it must overcome considerable friction to move the two attractive elements. As the thickness of the aquarium window increases, the size of the magnetic material used inside the two elements increases accordingly. When the weight of said air chamber and the magnetic material are equal to the buoyance, the interior element will float in water and yet move smoothly on the surface of the window due to the magnetic influence of the exterior element. On the other hand, when the weight of said air chamber and the magnetic material is not equal to the buoyance, say heavier than the buoyance, the interior element will sink to the bottom of the water upon removal of the magnetic force. When the weight of said air chamber and the magnetic material is lighter than the buoyance, the higher buoyance makes the movement of the interior element more difficult, as known from Chinese Patent Application No. 2008000767 that also is Publication No. CN 1302182. Furthermore, a much stronger magnetic force is required to make the two elements attract while cleaning near the bottom of the aquarium to overcome the detachment of the interior and exterior elements. Moreover, the right angle shape of the bottom plate of the interior element makes it suitable only for cleaning the conventional rectangular aquarium, and is thus quite difficult to move on the curved window surface of aquariums which are available more and more on the market.

SUMMARY OF THE INVENTION

One object of the present invention is to provide a suspendable magnetic brush, which is capable of floating on the water in an aquarium by means of weight adjusting so that the two attracted elements can move more smoothly on the windows, thus cleaning the aquarium.

Another object of the present invention is to provide a suspendable magnetic brush for cleaning both planar and curved aquarium windows.

The above objects of present invention are carried out by a buoyant suspendable magnetic brush for cleaning aquarium windows comprising an upper cover with an air chamber attached tightly to a bottom cover with a cleaning material layer underneath, an inner cover with a magnet located therein being provided inside the air chamber, said inner cover being attached to a bottom cover while being isolated from the air chamber, characterized in that said bottom cover has at least one convex edge, and said upper cover has at least one or two through holes for adjusting the air volume remained in the air chamber. The through holes can be provided with a sealing pad and a knob to connect the inside of the air chamber with the outside.

A magnet is located in the inner cover, and is isolated from the air chamber. The magnet is placed near the concave edge of the bottom cover while being pressed by an iron pad. A sponge pad is used to fix the magnet and the iron pad near the concave edge between the inner cover and the bottom cover.

Said bottom cover has at least one convex edge, or all the edges could be convex. Cleaning material layer is provided at the lower surface of the bottom cover. With its convex edge(s), the cleaning material can be adhered to the bottom cover's lower surface easily without the need for making the material of specific size and shape (e.g., cleaning material with curved side surface) and it is easy to replace.

With above solution, it is possible to adjust the air or liquid allowed to enter the air chamber through the holes connecting the upper cover and the air chamber so that the weight of the magnetic brush can be adjusted so as to balance all the forces exerted upon the interior magnetic brush. As a result the two attractive elements of the brush may move smoothly on aquarium windows from various sized aquariums. With the convex edge(s) of the bottom cover matching the curved window surface of the aquarium the magnetic brush can make rapid cleaning movements. When the magnetic force between two attractive elements has been broken, the interior element will float to and on the surface of water so that it can be readily removed. Because the weight of the interior magnetic element is adjusted so as that it is buoyant, the interior element will float in water. As such, an application of a smaller force to the exterior magnetic element will cause the interior element readily move to the bottom of aquarium to clean the lower and/or bottom parts. Moreover, with the interior element suspended in water it can be temporally detached from the exterior brush when cleaning round certain obstacles, such as pumps, water plants, decoration and will be back to the influence of the exterior element's magnetic force after leaving such obstacles, thus improving the cleaning efficiency. The present invention can be used to clean both planar window surfaces, including aquarium bottoms, and curved window surfaces, including aquarium bottoms having convex edge(s).

The above figures are provided for illustrative purposes only. It should be noted that actual dimensions and features devices according to embodiments of the present invention may differ from those shown.

DETAILED DESCRIPTION

Figure 1:
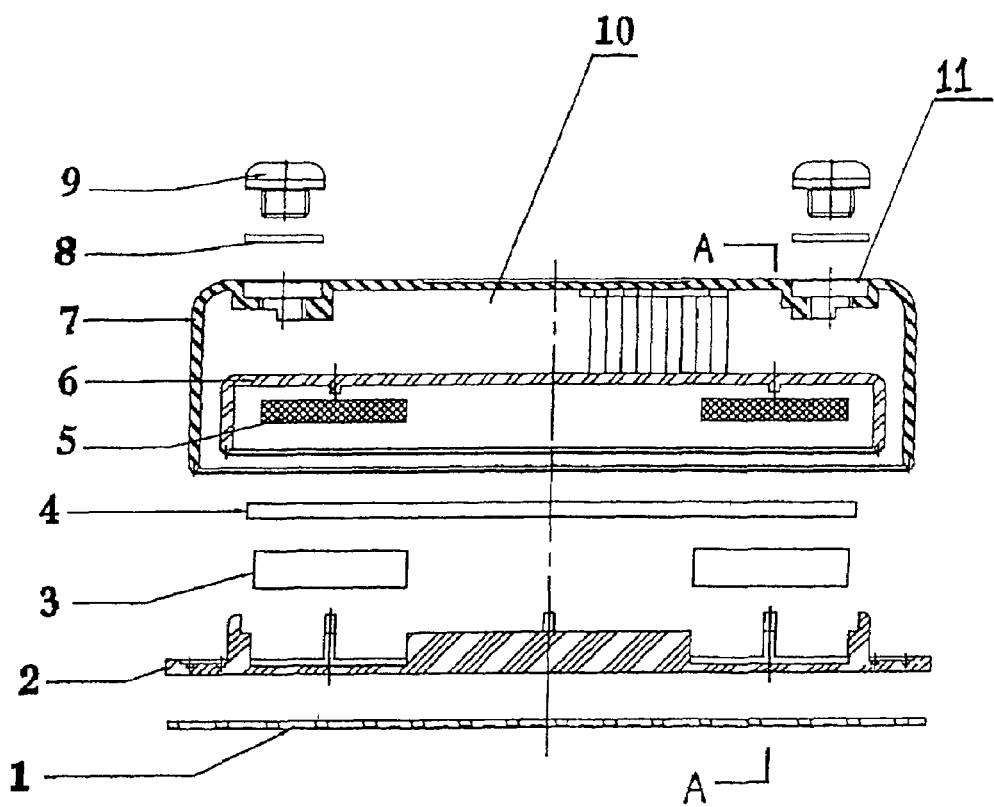
FIG. 1 shows schematically a sectional view of a device in accordance with an embodiment of present invention.
Figure 2:
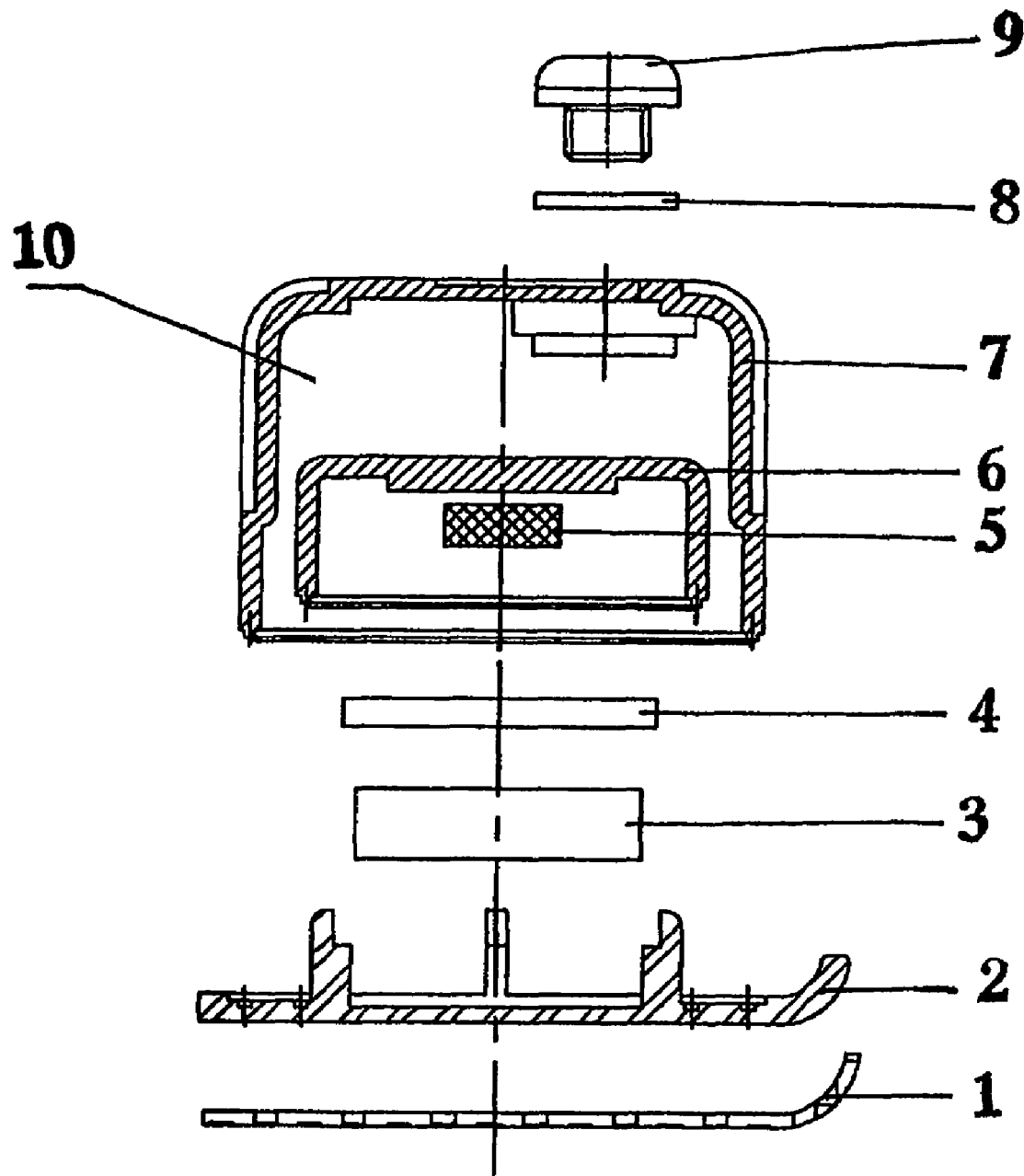
FIG. 2 is a sectional view of FIG. 1 taken along A-A.

As shown in FIGS. 1 and 2, the brush of the present invention comprises an upper cover 7 having an air chamber 10 therein in which there is provided an inner cover 6 isolated from the upper cover 7. The inner cover 6 is fitted to the bottom cover 2. A magnet 3 is provided inside the inner cover 6 and is placed in a convex part of the bottom cover 2 and pressed by an iron pad 4. A sponge pad 5 is placed between the inner cover 6 and the iron pad 4 to press the iron pad 4 and the magnet 3 downward and thus fix them to the bottom cover 2. The upper cover 7 has two through holes 11 therein for connecting the inside and the outside of the air chamber 10, thus allowing air or liquid to enter it. A sealing pad 8 and a knob 9 are provided for the though holes 11 to allow sealing. The amount of air or liquid allowed to enter the air chamber 10 can be adjusted as needed, thus the weight of the magnetic brush can be controlled. Cleaning material layer 1, made of a material such as flocked fiber, fiber etc, is Provided on the underside of the bottom cover 2 by means of an adhesive or glue. As shown in FIG. 2, an edge of said bottom cover 2 has a convex curve.

When used, the through holes on the upper cover 7 need to be opened at first, to allow an amount of liquid into the air chamber 10 such that the weight of the interior element is increased yet can still be suspended in the water. Subsequently, the through holes 11 are sealed with sealing pad 8 and knob 9. Thereafter, the interior element with the air chamber 10 is placed on the inner window of aquarium, while the exterior element with or without the air chamber 10 is placed on the exterior window of aquarium. By the increased weight of the interior element counteracting most of the upward buoyance, the forces exerted on the interior element reaches a balance. Thus, only a very small force need be applied to the exterior brush to manipulate the interior element easily on the inner window to the bottom of aquarium once the two elements are attracted each other. The lower plane surface of the bottom cover 2 is capable of cleaning the planar surface of the aquarium, while the convex edge is capable of cleaning the curved surface. Said convex edge can be provided either on a single edge or multiple edges of the bottom cover 2, thus providing a device with 1-4 convex edges. After the attracting magnetic force has been eliminated, the interior element will rise and float to the surface of water as its air chamber 10 has a certain amount of air within it, thus allowing easy removal.

Figure 3:
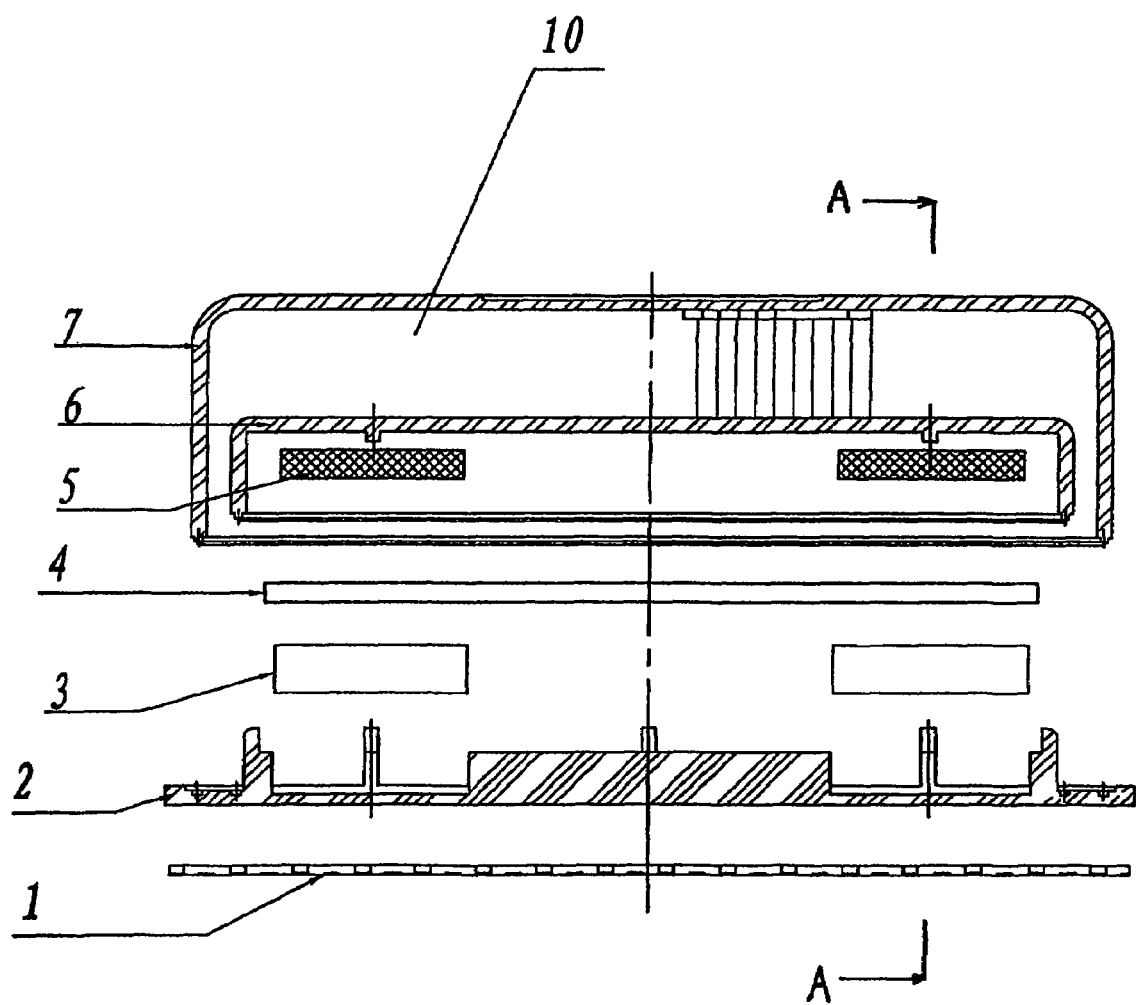
FIG. 3 shows schematically a sectional view of a device in accordance with an embodiment of present invention.
Figure 4:
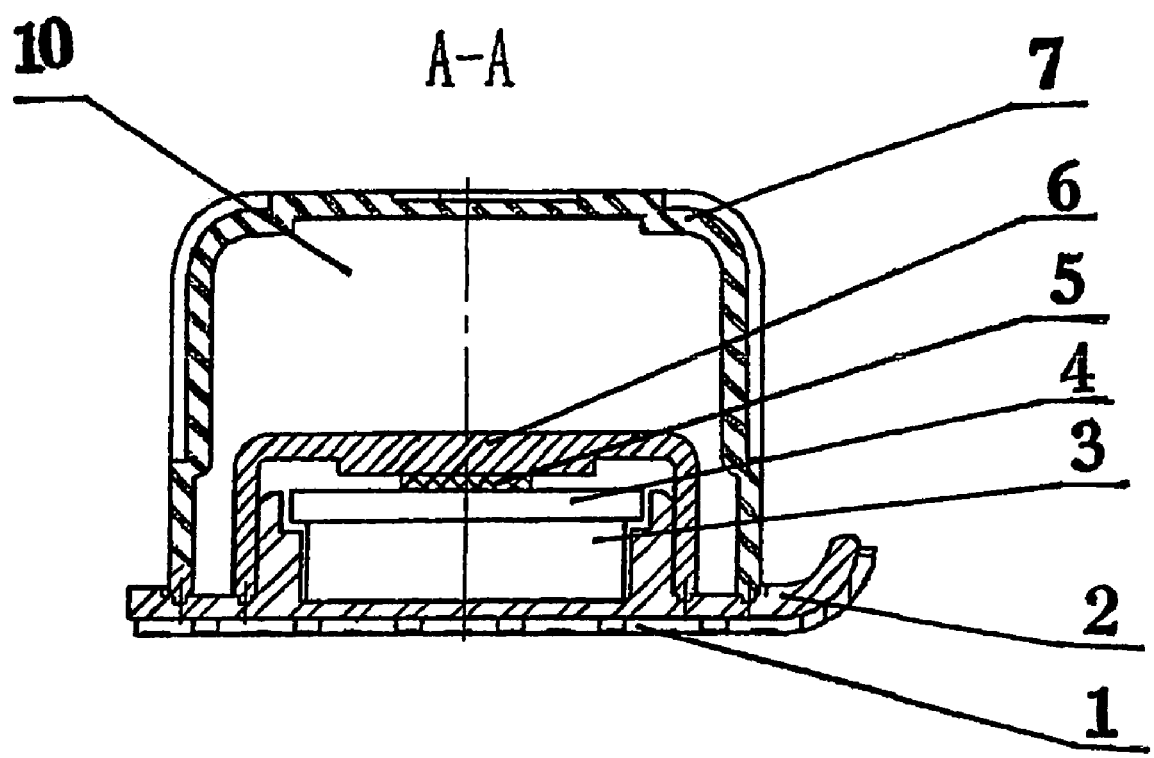
FIG. 4 shows a sectional view of FIG. 1 taken along A-A.
Figure 5:
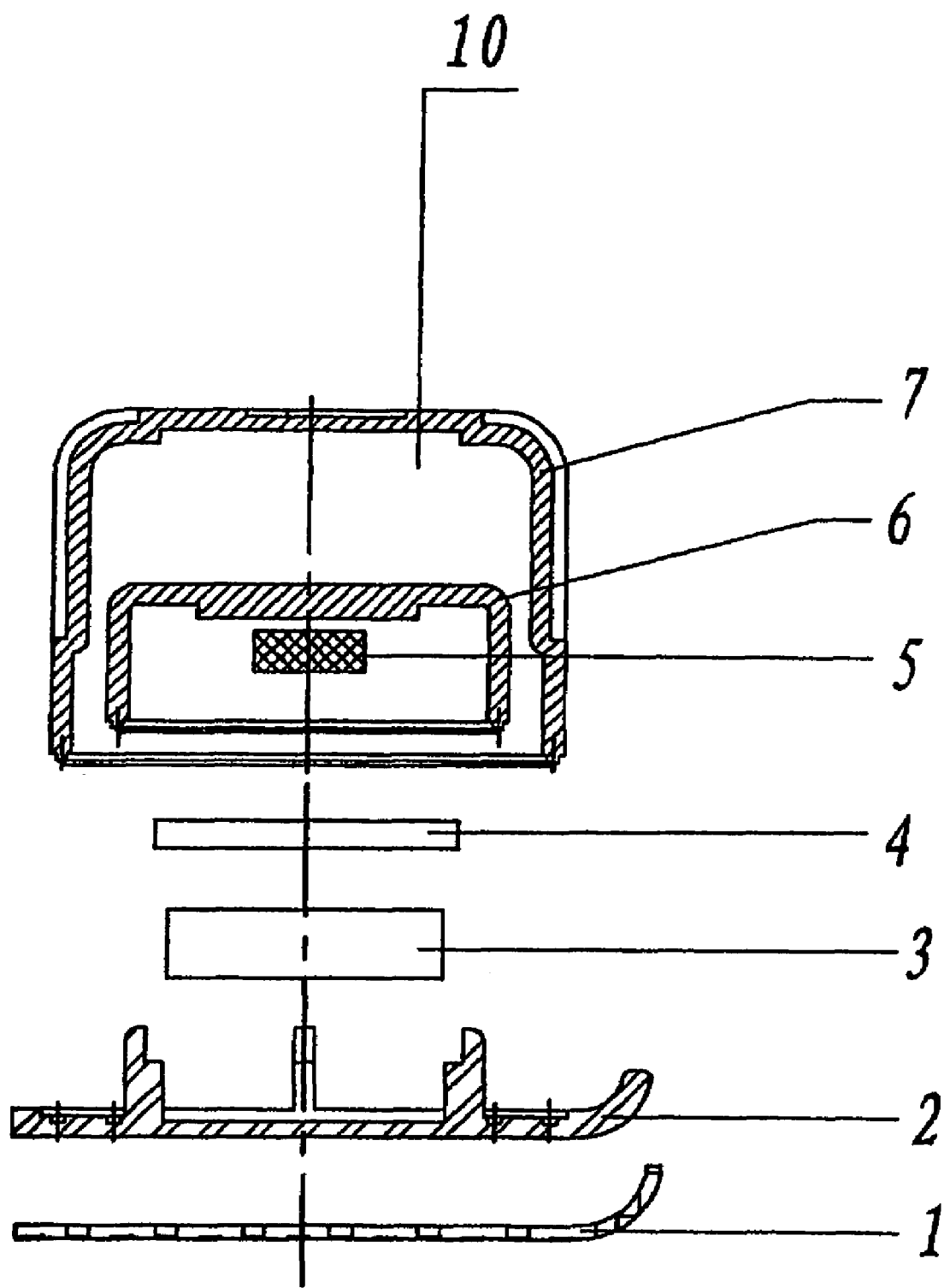
FIG. 5 shows an exploded view of FIG. 4.

As shown in FIGS. 3, 4, and 5, the embodiment shown is similar to the above one except that it lacks a through hole connecting the air chamber 10 provided in the upper cover 7. In this embodiment, the air chamber 10 is full of air.

When used, the element with the air chamber 10 is placed on the inner window of the aquarium, while the other element is placed on the exterior window of the aquarium, thus making them attract each other. By manipulating the exterior brush, the interior element will be made to move along the curved window surface, thus cleaning the inner planar and curved window surfaces. After the magnetic force attracting the elements is eliminated upon the exterior brush being taken away, the interior element will rise and float to the surface of water or suspend in it, thus being capable of easy removal.

The invention claimed is:

1. A suspendable magnetic brush for cleaning an aquarium with a curved window surface, comprising:

An upper cover with an air chamber, the upper cover being attached tightly to a bottom cover, the bottom cover having a cleaning material layer attached underneath;

An inner cover with a magnet located therein being provided inside the air chamber, said inner cover being attached to the bottom cover while isolated from the air chamber, said bottom cover having at least one convex edge, and said upper cover having a plurality of through holes for adjusting the air volume remained in the air chamber, wherein the magnet is provided inside the inner cover, the magnet being isolated from the air chamber, the magnet being located in the convex edge of the bottom cover and being pressed by an iron pad, a sponge pad being used to press the magnet and the iron pad, such that the magnet is fixed to the concave edge between the inner cover and the bottom cover.

2. A suspendable magnetic brush for cleaning in aquarium with a curved window surface according to claim 1, wherein said through holes connect an inside and an outside of said air chamber, said through holes being provided with a sealing pad and a knob.

3. A suspendable magnetic brush for cleaning an aquarium with a curved window surface according to claim 1 or 2, wherein the cleaning material layer adhering to the lower surface of said bottom cover is flocked fiber or fiber.

4. A suspendable magnetic brush for cleaning an aquarium with a curved window surface, comprising:

An upper cover with an air chamber, the upper cover being attached tightly to a bottom cover, the bottom cover having a cleaning material layer attached underneath;

An inner cover with a magnet located therein being provided inside the air chamber, said inner cover being attached to the bottom cover while isolated from the air chamber, said bottom cover having at least one convex edge, and said upper cover having at least one through hole for adjusting the air volume remained in the air chamber;

Wherein said through hole connects an inside and an outside of said air chamber, said through hole being provided with a sealing pad and a knob, and wherein a magnet is provided inside the inner cover, the magnet being isolated from the air chamber, the magnet being located in the convex edge of the bottom cover and being pressed by an iron pad, a sponge pad being used to press the magnet and the iron pad, such that the magnet is fixed to the convex edge between the inner cover and the bottom cover.

5. A suspendable magnetic brush for cleaning an aquarium with a curved window surface according to any of claim 4, wherein the cleaning material layer adhering to the lower surface of said bottom cover is flocked fiber or fiber.

6. A suspendable magnetic brush for cleaning an aquarium with a curved window surface, comprising:

An upper cover with an air chamber, the upper cover being attached tightly to a bottom cover, the bottom cover having a cleaning material layer attached underneath;

An inner cover with a magnet located therein being provided inside the air chamber, said inner cover being attached to the bottom cover while isolated from the air chamber, said bottom cover having at least one convex edge;

Wherein the magnet is provided inside the inner cover, the magnet being isolated from the air chamber, the magnet being located in the convex edge of the bottom cover and being pressed by an iron pad, a sponge pad being used to press the magnet and the iron pad, such that the magnet is fixed to the convex edge between the inner cover and the bottom cover.

7. A suspendable magnetic brush for cleaning an aquarium with a curved window surface according to claim 6, wherein the upper cover includes at least one through hole for adjusting the air volume remained in the air chamber.

8. A suspendable magnetic brush for cleaning in aquarium with a curved window surface according to claim 6, wherein said through hole connects an inside and an outside of said air chamber, said through hole being provided with a sealing pad and a knob.

9. A suspendable magnetic brush for cleaning an aquarium with a curved window surface according to any of claims 6 or 7, wherein the cleaning material layer adhering to the lower surface of said bottom cover is flocked fiber or fiber.

\* \* \* \* \*